June 24, 1930.  M. A. PETERSON  1,766,531
TIRE PROTECTOR
Filed Nov. 11, 1927  3 Sheets-Sheet 1

Inventor
M.A. Peterson
By Lacey & Lacey, Attorneys

June 24, 1930.  M. A. PETERSON  1,766,531
TIRE PROTECTOR
Filed Nov. 11, 1927    3 Sheets-Sheet 2

Inventor
MAPeterson
By Lacey & Lacey, Attorneys

June 24, 1930.  M. A. PETERSON  1,766,531
TIRE PROTECTOR
Filed Nov. 11, 1927   3 Sheets-Sheet 3
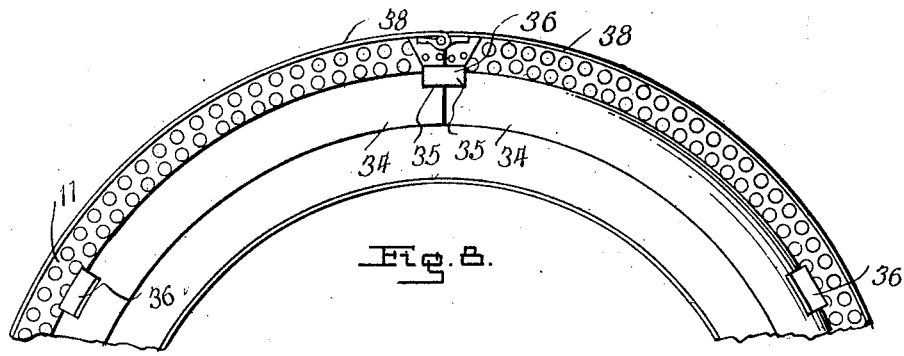
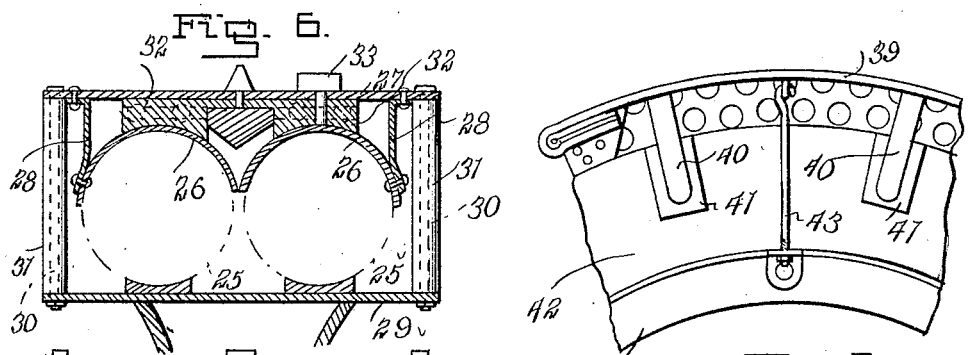
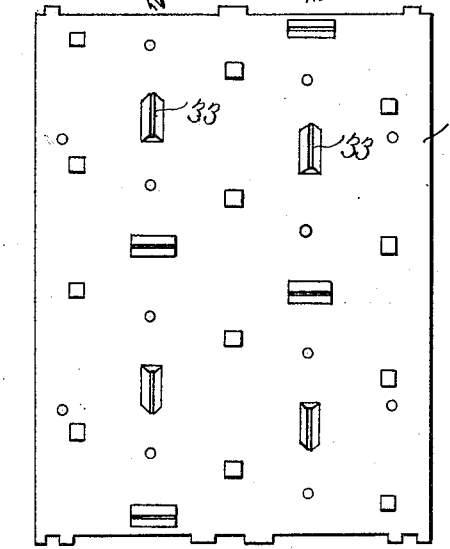
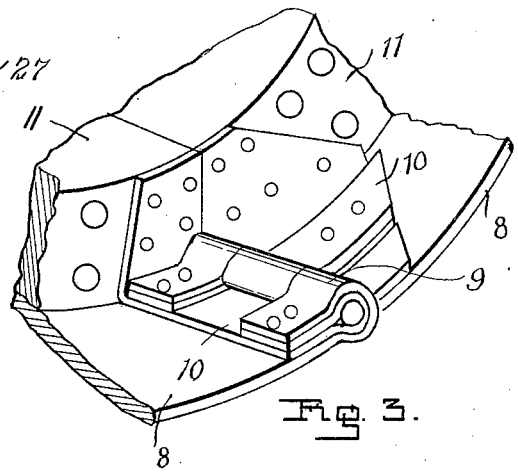
Inventor
M.A. Peterson
By Lacey & Lacey, Attorney Patented June 24, 1930

1,766,531

UNITED STATES PATENT OFFICE

MARTIN A. PETERSON, OF FREMONT, NEBRASKA

TIRE PROTECTOR

Application filed November 11, 1927. Serial No. 232,668.

The present invention is directed to improvements in tire protectors.

The primary object of the invention is to provide a device of this kind so constructed that it can be placed upon a pneumatic tire, and when in place thereon will not only protect the tire against injury, but will provide a relatively large tread in order that a vehicle equipped with the device can travel over soft or muddy ground.

Another object of the invention is to provide a device of this character so constructed that it can be easily and quickly applied to or removed from a tire.

Another object of the invention is to provide a device of this character including a plurality of treads hingedly connected, said treads being so formed that cleats can be applied thereto, or removed, as the occasion requires.

With these and other objects in view, this invention resides in novel features of construction, formation, combination and arrangement of parts hereinafter to be more fully described, claimed and illustrated in the accompanying drawings, in which—

Figure 3 is a detail fragmentary perspective view of the hinge connection for the treads.

Figure 6 is a transverse sectional view through a modified form of the invention.

Figure 7 is a plan view of the treads used in connection with the modified form.

Figure 8 is a fragmentary side view of another modified form of the invention.

Figure 9 is a similar view of still another modified form of the invention.

Figure 1:
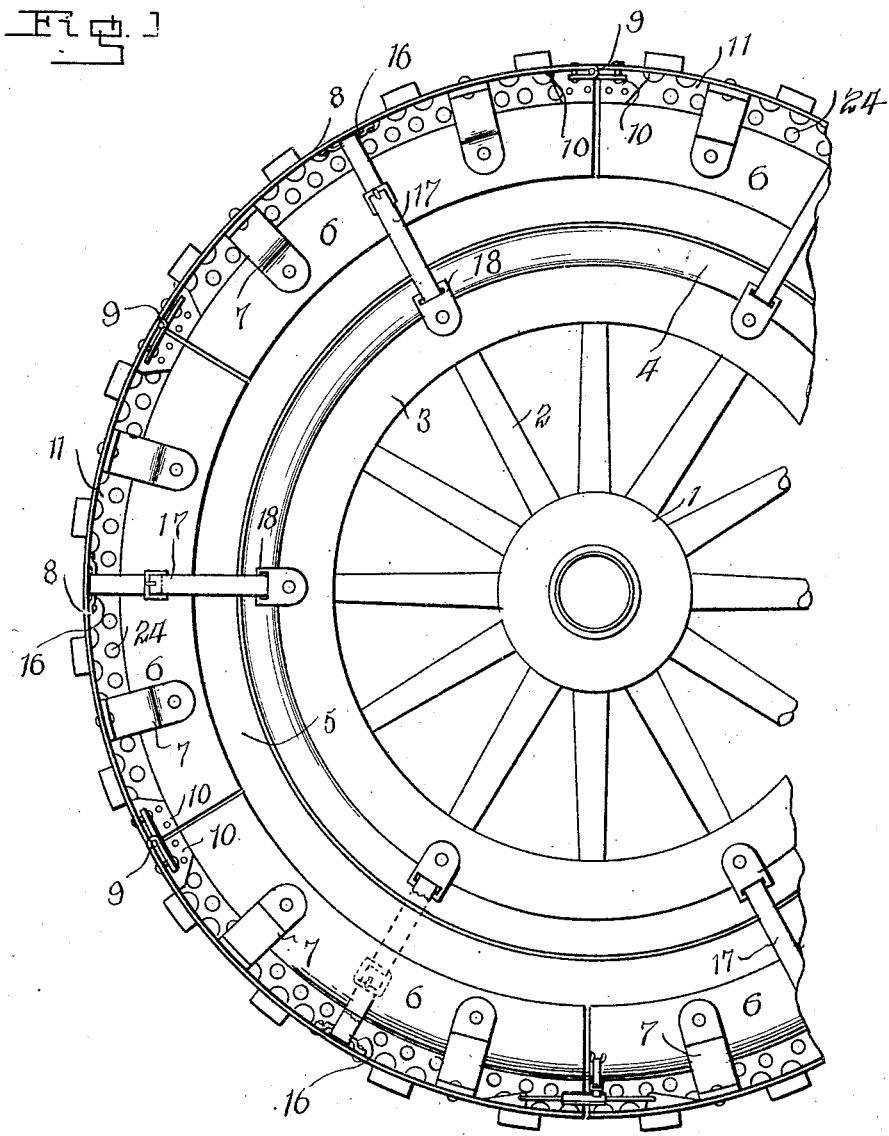
Figure 1 is a fragmentary side elevation of a wheel, showing the same equipped with the device.

Referring to the drawings, 1 designates a wheel which includes the spokes 2, felly 3 and tire retaining rim 4 for holding the pneumatic tire 5 thereon, as is customary.

The protector comprises a plurality of longitudinally curved metal sections 6 which are also curved transversely to conform to the transverse curvature of the tire which they intimately engage. The number of sections of course can be increased or decreased according to the size of the tire upon which the protector is applied.

Each section has fixed thereto the inner ends of a pair of sheet metal brackets 7, the outer ends of which are fixed to the treads 8 formed from stout metal, said treads being curved longitudinally so that when several are hingedly connected a substantially circular tread will be provided, which will conform to the circumferential curvature of the sections 6 and tire 5. The treads will obviously correspond in number to the sections 6.

The treads 8 have their adjacent ends connected by hinges 9 which are carried by reinforcing plates 10 riveted thereto and to the sides of the ribs 11, it being obvious that should the hinges break they may be replaced upon removing the rivets.

Figure 2:
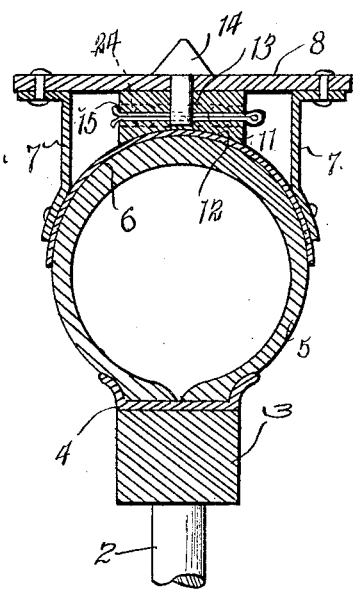
Figure 2 is a transverse sectional view therethrough.
Figure 4:
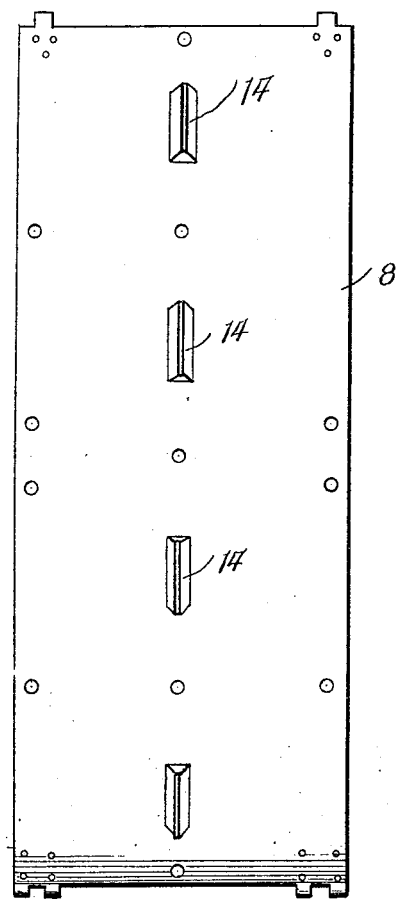
Figure 4 is a plan view of one of the treads.

The treads are provided with ribs 11 which are carried by the inner sides thereof and have their inner faces provided with transversely curved seats 12 which rest upon the sections 6 and aid the brackets in supporting the treads 8. The ribs are provided with sockets 13 for receiving the shanks of the cleats 14, said shanks being retained in place by pins 15, as shown in Figure 2 of the drawings. While I have illustrated these shanks as being retained by pins, it will be of course understood that they may be threaded in the ribs or secured therein in any other manner desired.

To prevent creeping of the protector upon the tire the treads have upon their opposite sides loops 16 in which the straps 17 are engaged, said straps being also secured to the loops 18 carried by the opposite sides of the felly 3, there being two straps for each tread.

Figure 5:
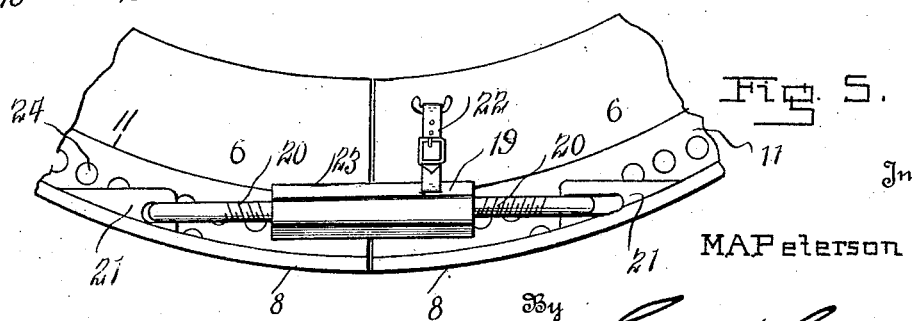
Figure 5 is an enlarged detail side elevation, showing the turn buckle for connecting the treads.

The two terminal treads have their adjacent ends free from a hinge in order that the protector can be opened to apply the same to the tire, it being essential that the treads, as well as the associated sections 6 be united, and in order to accomplish this a turnbuckle 19 is employed, one upon each side, the bolts 20 thereof being engaged in the plates 21 fixed to the treads 8, as shown in Figure 5, there being straps 22 connecting the barrel 23 of the turnbuckles with the adjacent sections 6 to prevent accidental rotation of the turn buckles.

The ribs 11 are formed with a plurality of perforations 24 to permit ventilation.

In Figures 6 and 7 there is illustrated a modified form of the invention which is for use in connection with truck or bus wheels employing a pair of tires 25 upon each rear wheel. In this form of the invention a pair of sections 26 are employed, one for each tire, said sections being connected to the treads 27 by brackets 28, as in the preferred form of the invention. Trucks and busses usually employ disk wheels and the rim 29 of the disk wheel is illustrated in Figure 6, the treads 27 being secured thereto by bolts 30 confined in the spacing sleeves 31. The treads are provided with a pair of tire engaging ribs 32 and in which are seated cleats 33 which may be arranged at any desired angle thereon, and may be of any preferred design.

In Figure 8, another modified form of the invention, the sections 34 have notches 35 in their adjacent ends for engagement with the rubber lugs 36 carried by the tire, said lugs serving to prevent creeping of the protector upon the tire and being used in lieu of the straps 17 of the preferred form of the invention. Treads 38 are secured to the sections 34 as in the preferred form of the invention.

In Figure 9 the treads 39 have bars 40 connected thereto and provided with plates 41 which rest upon the sides of the tire 42 and are maintained in place by rods 43 which have their respective ends secured to the treads and felly 44.

Figure 10:
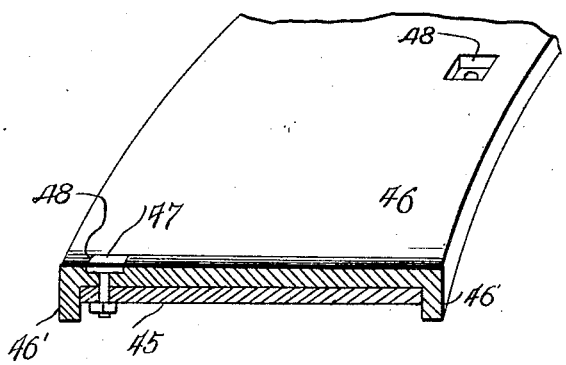
Figure 10 is a fragmentary detail perspective view of another modified form of the invention.

In Figure 10 a tread is designated by the numeral 45 and upon which is engaged a rubber tread 46 having side flanges 46' for engaging the sides of the tread 45, the tread 46 being retained on the tread 45 by bolts 47 which are engaged in sockets 48 of the tread 45. These sockets are also employed for securing the cleats when the tread 46 is not in use. The cleats are obviously removed from the treads and the tread 46 secured thereon. The tread 46 is primarily designed for use on city pavements where cleats are prohibited. It will be of course understood that under normal conditions the cleats will not be used, but since they are detachable and can be readily applied when desired they will add to the efficiency of the wheels. When the cleats are not used the protector is in the form of a continuous steel tire and will be comparatively smooth and can be used on pavements without injury thereto. Further, it will be observed that by using the treads 8, which are comparatively wide, that a vehicle equipped with the protector can be successfully propelled over soft or muddy ground.

Having thus described the invention, I claim:

A tire protector comprising a plurality of hingedly connected tread sections curved longitudinally and straight transversely, a like number of tire engaging sections curved both longitudinally and transversely, brackets between the marginal longitudinal edge portions of the tread and tire engaging sections and forming positive and brace connecting means therebetween, ribs between the middle portions of the tread and tire engaging sections, and cleats passing through the tread sections and secured in the said ribs.

In testimony whereof I affix my signature.

MARTIN A. PETERSON. [L. S.]